(12) United States Patent
Villion et al.

(10) Patent No.: US 8,706,125 B2
(45) Date of Patent: Apr. 22, 2014

(54) ALLOCATION OF COMMUNICATION CHANNELS

(75) Inventors: Mathieu Villion, Toulouse (FR);
Jean-Marie Voisin, Tournefeuille (FR);
Volker Wahl, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 177 days.

(21) Appl. No.: 13/128,900

(22) PCT Filed: Nov. 28, 2008

(86) PCT No.: PCT/IB2008/055660
§ 371 (c)(1),
(2), (4) Date: May 12, 2011

(87) PCT Pub. No.: WO2010/061248
PCT Pub. Date: Jun. 3, 2010

(65) Prior Publication Data
US 2011/0223956 A1    Sep. 15, 2011

(51) Int. Cl.
*H04W 72/00*    (2009.01)

(52) U.S. Cl.
USPC ........ 455/450; 455/451; 455/452.1; 455/464; 455/509

(58) Field of Classification Search
USPC ........... 455/422.1, 450–453, 456.2, 464, 509, 455/510; 370/395.41, 332; 375/E7.141
See application file for complete search history.

(56) References Cited

U.S. PATENT DOCUMENTS 5,751,730 A * 5/1998 Mourot ........................ 714/755
7,539,497 B2 * 5/2009 Beale ............................ 455/451

(Continued)

FOREIGN PATENT DOCUMENTS

| EP | 1761097 A | 3/2007 |
| WO | 03/063403 A | 7/2003 |
| WO | 2005/107304 A | 11/2005 |

OTHER PUBLICATIONS

3GPP: "3RD Generation Partnership Project; Technical Specification Group Radio Access Network; Physical Channels and Mapping of Transport Channels onto Physical Channels (FDD)(Release 7)" http://www.3gpp.org, 3GPP Organizational Partners, Technical Specification, 3GPP, TS 25.211, V7.10.0, Sep. 2010, pp. 1-55.

(Continued)

*Primary Examiner* — Dominic E Rego

(57) ABSTRACT

A method of allocating a plurality of communication channels of a network, for a plurality of network stations of the network. The method comprises generating a common transmission message for the plurality of network stations and transmitting the generated transmission message to the plurality of network stations. The message comprises channel allocation information allowing an allocation of channels by the network stations, the information relating to each of the plurality of network stations. A network managing station for communicating with the plurality of network stations, there being a plurality of communication channels available for use by the plurality of network stations. The network managing station comprises a processor, arranged to generate the common transmission message for the plurality of network stations and a transmitter arranged to transmit the generated transmission to said plurality of networks. A network station, capable of communicating over one or more of a plurality of communication channels, the network station comprising: a receiver, arranged to receive the common transmission message and a processor, arranged to determine a channel for use by the network station based on the received channel allocation information.

20 Claims, 2 Drawing Sheets

(56) References Cited

U.S. PATENT DOCUMENTS

| | | | |
|---|---|---|---|
| 7,680,125 B2* | 3/2010 | Hosein et al. | 370/395.4 |
| 7,826,851 B2* | 11/2010 | Kolding et al. | 455/450 |
| 2005/0063336 A1* | 3/2005 | Kim et al. | 370/329 |
| 2005/0117536 A1 | 6/2005 | Cho et al. | |
| 2006/0116080 A1* | 6/2006 | Eom | 455/62 |
| 2006/0285558 A1* | 12/2006 | Dottling et al. | 370/506 |
| 2007/0064641 A1* | 3/2007 | Laroia et al. | 370/320 |
| 2007/0087772 A1* | 4/2007 | Yi et al. | 455/522 |
| 2007/0110100 A1* | 5/2007 | Wunder et al. | 370/468 |
| 2007/0115862 A1* | 5/2007 | Lee et al. | 370/260 |
| 2007/0232314 A1* | 10/2007 | Kolding et al. | 455/436 |
| 2007/0254595 A1* | 11/2007 | Yoon et al. | 455/67.14 |
| 2008/0123615 A1* | 5/2008 | Hoshino et al. | 370/343 |
| 2008/0198803 A1* | 8/2008 | Lee et al. | 370/329 |
| 2009/0029714 A1* | 1/2009 | Rudrapatna | 455/452.2 |
| 2009/0074089 A1* | 3/2009 | Vannithamby | 375/260 |
| 2009/0075599 A1* | 3/2009 | Baker et al. | 455/67.14 |
| 2009/0181712 A1* | 7/2009 | Xu | 455/522 |
| 2009/0201825 A1* | 8/2009 | Shen et al. | 370/252 |
| 2009/0239523 A1* | 9/2009 | Miyamoto | 455/422.1 |
| 2009/0239525 A1* | 9/2009 | Cai et al. | 455/424 |
| 2009/0245337 A1* | 10/2009 | Ramachandran et al. | 375/224 |
| 2009/0305715 A1* | 12/2009 | Barve et al. | 455/452.2 |
| 2009/0316633 A1* | 12/2009 | Kato et al. | 370/329 |
| 2010/0098004 A1* | 4/2010 | Onodera et al. | 370/329 |
| 2010/0104044 A1* | 4/2010 | Kishigami et al. | 375/299 |
| 2010/0182961 A1* | 7/2010 | Kim et al. | 370/329 |
| 2010/0214928 A1* | 8/2010 | Nogami et al. | 370/241 |
| 2010/0254484 A1* | 10/2010 | Hamaguchi et al. | 375/295 |
| 2010/0317382 A1* | 12/2010 | Lee et al. | 455/501 |
| 2011/0164526 A1* | 7/2011 | Zhu et al. | 370/252 |
| 2011/0207487 A1* | 8/2011 | Yang et al. | 455/507 |
| 2012/0008613 A1* | 1/2012 | Lee et al. | 370/338 |
| 2012/0014280 A1* | 1/2012 | Li et al. | 370/252 |
| 2012/0076060 A1* | 3/2012 | Cai et al. | 370/311 |
| 2012/0202547 A1* | 8/2012 | Fukui et al. | 455/513 |
| 2013/0064122 A1* | 3/2013 | Hammarwall et al. | 370/252 |
| 2013/0064171 A1* | 3/2013 | Zhang et al. | 370/315 |

OTHER PUBLICATIONS

3GPP: "3RD Generation Partnership Project; Technical Specification Group Radio Access Network; Multiplexing and Channel Coding (FDD)(Release 7)" http://www.3gpp.org, 3GPP Organizational Partners, Technical Specification, 3GPP, TS 25.212, V7.11.0, Sep. 2009, pp. 1-103.

3GPP: "3RD Generation Partnership Project; Technical Specification Group Radio Access Network; Spreading and Modulation (FDD)(Release 7)" http://www.3gpp.org, 3GPP Organizational Partners, Technical Specification, 3GPP, TS 25.213, V7.7.0, Dec. 2009, pp. 1-36.

3GPP: "3RD Generation Partnership Project; Technical Specification Group Radio Access Network; Evolved Universal Terrestrial Radio Access (E-UTRA); Multiplexing and Channel Coding (Release 8)" http://www.3gpp.org, 3GPP Organizational Partners, Technical Specification, Lte, 3GPP, TS 36.212, V8.8.0, Dec. 2009, pp. 1-60.

3GPP: "3RD Generation Partnership Project; Technical Specification Group Radio Access Network; Evolved Universal Terrestrial Radio Access (E-UTRA); Physical Layer Procedures (Release 8)" http://www.3gpp.org, 3GPP Organizational Partners, Technical Specification, Lte, 3GPP, TS 36.213, V8.8.0, Sep. 2009, pp. 1-77.

International Search Report and Written Opinion correlating to PCT/IB2008/055660 dated Sep. 4, 2009.

\* cited by examiner

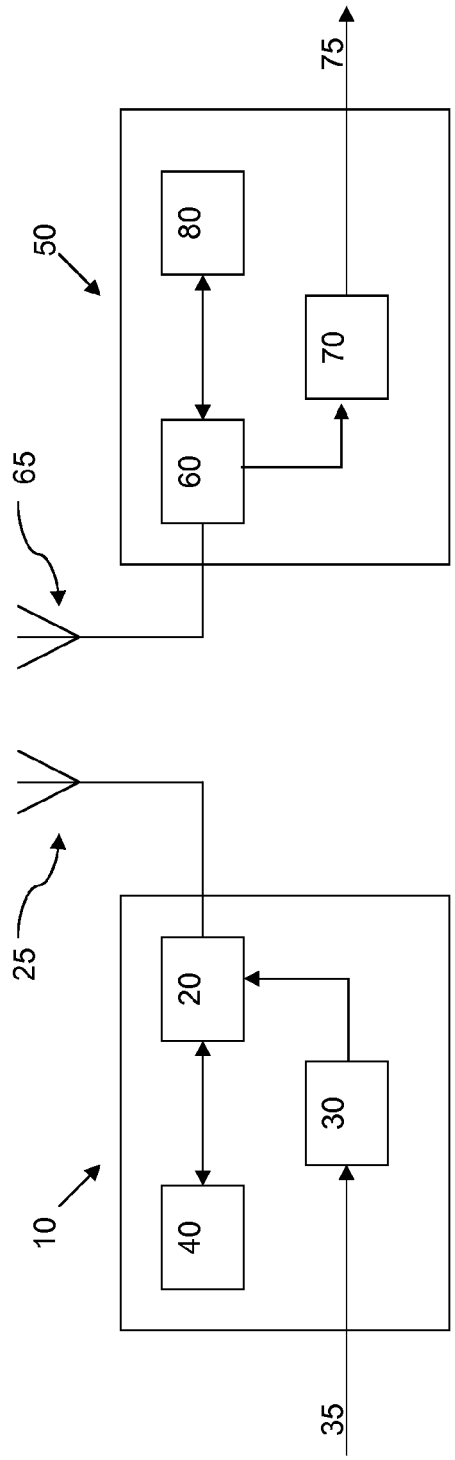
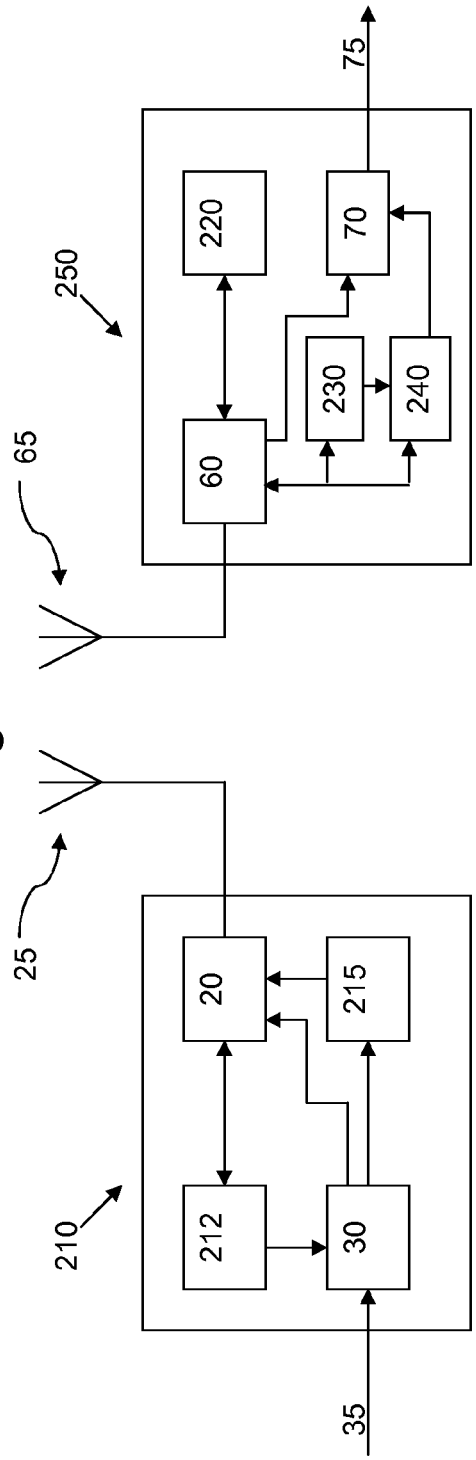
Fig. 1
Fig. 3

ALLOCATION OF COMMUNICATION CHANNELS

FIELD OF THE INVENTION

This invention relates to: a method of allocating a plurality of communication channels for a network; a method of determining at one network station within a network, a communication channel to be used by the network station; a network managing station for communicating with a plurality of network stations; and a network station, capable of communication over one or more of a plurality of communication channels. In particular, the network stations and network managing station may form part of a cellular network.

BACKGROUND TO THE INVENTION

In a communications network, use of the communications resources, such as the radio frequency spectrum can be shared between the stations of the network. In such case, the network stations in the network are each allocated zero, one, or more than one channel from a plurality of available communication channels. A channel can be associated with, for instance, one or more of: a time slot; e.g. in the case of FDMA, a frequency range (FDMA); and a transmission code (CDMA). The quality of a channel for one network station may be different from the quality of the channel for another network station. Moreover, for a given network station, the quality of one channel may be different from the quality of another channel. It is therefore possible to improve the quality of communications by appropriately allocating channels for each network station. A network station may be allocated multiple channels, which need not be contiguous.

As the number of channels that may be allocated increases, efficiency gains may be made by optimally allocating from a larger selection of channels. Packet data transmissions, as opposed to circuit-switched data transmission, may benefit from statistical multiplexing as the number of channels increases. For example, second and third generation cellular systems use forms of dynamic channel allocation, with the aim of allocating the desired quantity of resource to each network station. The increasing use of Orthogonal Frequency Division Multiplexing (OFDM) technology, for example in the proposed Long Term Evolution (LTE) cellular system, allows an even larger number of channels to be available.

In a cellular network, channels are usually allocated by a central station, often referred to as a base station. The network stations communicate exclusively with the base station and do not communicate directly with one another. In other types of network, one of the network stations may allocate channels between network stations. Each network station may communicate with one, more than one, or all of the other network stations. In either case, each of the network stations reports channel quality information to the station responsible for channel allocation, and that station then allocates channels and transmits an identification of the respective allocated channel or channels to each of the other network stations.

A known technique, proposed for LTE systems, uses a single bit to represent whether or not each channel is allocated to the respective network station. For example, a transmission of '01001' to a network station may indicate that the second and fifth channels of a set of five available channels have been allocated to that network station. However, the number of data bits needed to indicate the channel allocation thereby increases linearly as the number of channels increases. An increased quantity of allocation data can offset and even eliminate any efficiency gain that might be introduced due to the increased available selection of channels.

One approach to mitigate this problem is to allocate channels in groups. One way of doing this is to require that these groups contain a contiguous set of channels. Then, the group can be described in two fields: one indicating the channel on which the group starts; and the other indicating the number of channels in the group. This technique is used in High Speed Downlink Packet Access (HSDPA) and Digital Audio Broadcasting (DAB) systems, for example.

Another way to achieve this is to group channels together in a fixed way and allocate these fixed groupings amongst the network stations. This is proposed for the Long Term Evolution (LTE) cellular systems. In these approaches, there may some efficiency gains over previous techniques due to the use of a larger selection of channels and by minimising the additional overhead information needed to control those channels, by allocation groups of channels together. Nevertheless, there is the potential for further efficiency gains if the overhead information required to allocate channels can be further reduced.

SUMMARY OF THE INVENTION

The present invention provides a method of allocating a plurality of communication channels for a network, a method of determining at one network station within a network, a communication channel to be used by the network station, a network managing station for communicating with a plurality of network stations, and a network station, capable of communication over one or more of a plurality of communication channels as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

FIG. 1 schematically shows an example of a base station and user equipment (UE) station.

FIG. 3 schematically shows another example of a base station and user equipment (UE) station.

DETAILED DESCRIPTION OF THE PREFERRED EMBODIMENTS

Figure 2:
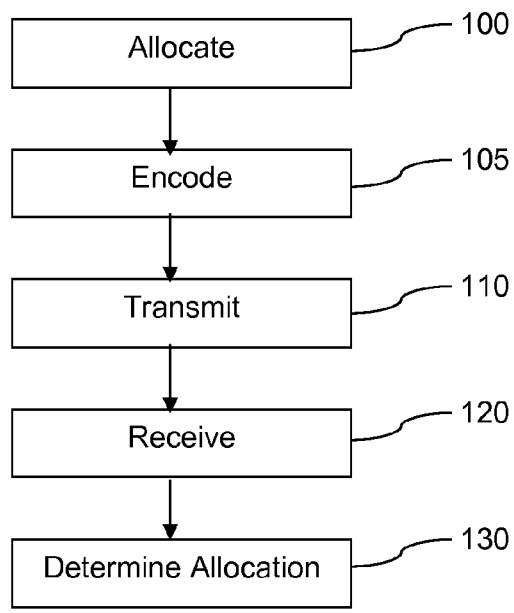
FIG. 2 shows a flow diagram, illustrating an example of a channel allocation process.

In the following examples will be described with reference to a third generation cellular communication system, but it will be appreciated that the techniques may be applied in different communication systems, such as, for example: private mobile radio (PMR); the Global System for Mobile Communication (GSM); Enhanced Data rates for GSM Evolution (EDGE); General Packet Radio System (GPRS); Wideband Code Division Multiple Access (WCDMA) or Universal Mobile Telecommunications System (UMTS);

Third Generation Long Term Evolution (LTE); Wireless Local Area Networks (WLAN); Worldwide Interoperability for Microwave Access (WIMAX); Bluetooth; or another communication system operating according to one or more communications protocols.

Referring to FIG. 1, there is in FIG. 1 a first example of an embodiment of a base station 10 and User Equipment (UE) station 50. Only one UE station 50 is illustrated, however the system may comprise multiple UE stations in communication with base station 10. The terms "base station" and "UE station" are used in this description, although it will be recognised that a "base station" is a form of central station and a UE station is a form of network station and the more general terms are equally applicable.

The shown example of a base station 10 comprises: a transceiver 20; an antenna 25; an input 35; a multiplexer 30; and a processor 40. The shown example of a UE station 50 comprises: a transceiver 60; an antenna 65; a de-multiplexer 70; a data output 75; and a processor 80.

In the base station 10, the transceiver 20 is coupled to antenna 25 and in the UE station 50 the transceiver 60 is coupled to the antenna 65 as well. In the following, the system is supposed to operate in a downlink mode, wherein data for transmission from the base station 10 to UE station 50 is received at input 35 and provided to multiplexer 30. However, it should be noted that the systems may also have an uplink mode. In the downlink mode, multiplexed data is provided to transceiver 20 by the multiplexer 30. Processor 40 is also coupled to transceiver 20. In the UE station 50, transceiver 60 is coupled to de-multiplexer 70, de-multiplexers the data received from the transceiver provides data to data output 75. Data provided to data output 75 may be outputted to other parts of the UE station 50 or to parts of a user interface (not shown) of the UE station 50. In the UE station 50, the processor 80 is coupled to transceiver 60. The processor 80 may process data received from the transceiver 60 and/or transmit data to be transmitted via the antenna and/or process other data.

When the base station is in operating mode, the processor 40 in the base station 10 determines the channel allocation for each of the UE stations 50 associated with the base station 10. In a typical cellular network, only a proportion of the UE stations 50 that form part of the network are associated with a specific base station 10 at any given time. The processor 40 provides the channel allocation data to the transceiver 20. Transceiver 20 provides data indicative of this channel allocation to all UE stations 50 in the system, including the shown UE station 50, in a common transmission, which comprises overhead information to address the transmission to all of the UE stations 50 (as discussed in more detail later). After sending the channel allocation data, the multiplexed data from multiplexer 30 can be transferred to the transceiver 20 for transmission to the UE station 50 over the channel allocated to UE station 50.

Upon reception of the channel allocation information at the UE station 50, the channel allocation information is transferred to processor 80, which identifies the channel allocation for the UE station 50 (i.e. the channels for the UE station 50 to use) and provides this identification to transceiver 60 for a corresponding resource allocation. The transceiver 60 is then able to receive the data transmitted by the base station 10 over the allocated channels. This received data may be de-multiplexed in de-multiplexer 70 and provided to output 75 after reception by the transceiver 60.

Referring now to FIG. 2, there is shown a flow diagram, illustrating an example of a channel allocation process which can e.g. by performed by the example of FIG. 1. As indicated with the block 100, the base station 10 allocates each of the channels to none, one or more than one of the UE stations 50. This may be done using any known suitable channel allocation method and for sale of brevity will not be described in further detail. As indicated with block 105, the base station 10: (a) prepares channel allocation information identifying zero, one or more than one channel for use by each of the UE stations 50; (b) generates a transmission comprising the channel allocation information relating to each of the UE stations 50, the whole of the transmission being addressed to all of the UE stations 50; and (c) encodes the transmission using a constant coding rate. As indicated with block 110, the base station 10 broadcasts the channel allocation information for multiple UE stations 50, prepared at the stage represented by block 105, in the single transmission generated at the stage represented by 105. As indicated with block 120, the broadcast transmission is received at UE station 50 and As indicated with block 130, the UE station 50 uses the channel allocation information contained within the received transmission to determine the channel for use by the UE station 50, i.e. the UE station 50 determines which channels are allocated to it, based on the received channel allocation information.

As indicated with block 105, the generation of the message includes adding suitable overhead information to the channel allocation information. For example, address information (identifying the UE stations 50 to which the transmission is to be broadcast), and error-detection and/or correction data (such as a cyclic redundancy check (CRC)) may be introduced. A single channel code, for example a Turbo code, at a fixed coding rate, is used to encode the transmission, so as to improve the transmission's robustness to noise and interference. However, it will be appreciated that a transmission with the channel allocation information may be generated (and encoded) in other ways. Since all of the channel allocation information is provided in a common transmission, the encoding can be optimised for efficiency. For example, the channel allocation information transmission may have reduced or may even lack addressing information, to reduce the amount of overhead thereby.

As indicated with block 110, the transmission generated at the stage represented by 105 and comprising the channel allocation information relating to each of the UE stations 50 is transmitted over a channel, which may be a predetermined channel, common to all UE stations, such as a dedicated control information channel, and may use a predetermined transmission power. The transmission may e.g. be transmitted over a single channel or over multiple channels. The base station 10 may provide a common description of all of the resource allocations to all of the UE stations 50. The stages represented by blocks 105 and 110 of this process may be performed repeatedly at a predetermined interval. For example, the channel allocation information may be transmitted every 10 frames (a frame being a time period defined by the communications protocol).

In the example shown in FIG. 1, the channel allocation information comprises a plurality of channel associations. Each channel association comprises: a network station identifier (this identifies at least one of the UE stations 50); and an associated channel identifier (which identifies at least one of the channels). This channel association means that each UE station identified by the network station identifier is allocated the channels identified by the channel identifier for use in either transmission or reception.

For example, to allocate four channels (1, 2, 3 and 4) to three UE stations (A, B and C), the base station 10 can transmit the following channel allocation information: "1 A 2 B 3 B 4 C". This would indicate that channel 1 is allocated to UE station A, channel 2 and channel 3 are allocated to UE station B, and channel 4 is allocated to UE station C. At UE station A, all of the common channel allocation information is received and the UE station notes that it has been allocated channel 1. It then proceeds to use that channel. Similarly, UE station B receives all of the common channel allocation information, and notes that it has been allocated channel 2 and channel 3. Finally, UE station C also receives all of the common channel allocation information, and notes that it has been allocated channel 4. As for UE station A, UE stations B and C each proceed to use their allocated channel.

As a further example, there may be an additional, fourth UE station (D). If the base station 10 transmits the same channel allocation information: "1 A 2 B 3 B 4 C", UE station D receives all of this information and identifies that it has not been allocated a channel. Then, UE station D does not use any dedicated channel (although it may use a common channel) until the next channel allocation information is received. If a channel is not identified (for example channel 5), each UE station 50 can infer that the channel is not allocated. Alternatively, a channel can be identified without identifying an associated UE station 50, in order to indicate that the channel is not allocated to any UE station 50 (for example, transmitting "1 A 2 B 3 B 4 C 5" from the base station 10 would identify channel 5 as being allocated to no UE stations).

In contrast, transmitting this information individually to each UE station using the existing LTE approach: UE station A would receive 1000; UE station B would receive 0110; UE station C would receive 0001; and UE station D would receive 0000. The transmission to each UE station would be separate and would have power and coding determined depending on the designated recipient UE station. Each of these transmissions would also require separate addressing overhead information. Each UE station would not necessarily be aware of the channel allocation for other UE stations, making Multi-User Detection techniques more difficult to implement.

A comparison of the approach described above and existing approaches is now provided. Assuming that $N_{RB}$ channels have to be shared between multiple UE stations 50. For example, in LTE, a maximum value of $N_{RB}$ of 110 channels is currently defined, based on grouping multiple available transmission symbols into one channel. However, if each available transmission symbol is considered a channel, $N_{RB}$ is in the order of 10000.

In the existing approach used in HSDPA, wherein an allocation is indicated by a start channel and an allocation length, to allocate $N_{RB}$ "resource blocks" for $N_u$ UE stations 50, requires $N_b = 2N_u \lceil \log_2(N_{RB}) \rceil$ bits to describe the channel allocation information for all UE stations 50. For 5 UE stations 50 and 110 channels, 70 bits are therefore required. If the number of channels is increased to 10000, 140 bits are required. However, for 100 UE stations 50, if there are 110 channels, 1400 bits are required, and for 10000 channels, 2800 bits are needed. In other words, increasing the number of UE stations 50 significantly increases the number of bits required. Furthermore, this approach enables the allocation of contiguous channels, which may prevent the most efficient allocation possible.

In the technique proposed for LTE systems, the number of required bits is $N_b = N_u N_{RB}$. Hence, for 5 UE stations and 110 channels, 550 bits therefore required. If the number of channels is increased to 10000, 50000 bits are required. For 100 UE stations, if there are 110 channels, 11000 bits are required, and for 10000 channels 1000000 bits are needed. Accordingly, when the number of channels is increased, the number of bits increases disproportionably.

In the approach described in relation to the first example, where each channel is allocated to a single UE station and is not shared by multiple UE stations, the number of bits needed is $N_b = \lceil \log_2(N_u) \rceil N_{RB}$. For each channel, $\lceil \log_2(N_u) \rceil$ bits are need to identify that this channel is allocated to a UE station with an index ranging from 1 to $N_u$ (for example, for 8 UE stations, 3 bits are needed). Thus, for 5 UE stations and 110 channels, 330 bits are required, but for 10000 channels, 30000 bits are required. For 100 UE stations, if there are 110 channels, 770 bits are required, and for 10000 channels, 70000 bits are needed. As a result, the number of bits required is significantly less than that proposed for LTE systems, without preventing the allocation of non-contiguous channels.

Referring now to FIG. 3, there is shown a second example of an embodiment of a base station 210 and user equipment (UE) station 250, forming part of an LTE system using OFDM. Where the same features as shown in the embodiment of FIG. 1 are described, identical reference numerals are used. Again, although only one UE station 250 is illustrated, the network may comprise multiple UE stations 250, which are not shown, in communication with base station 210.

In this example, the base station 210 does not provide the channel allocation for all UE stations 250 explicitly. Instead, the base station 210 transmits Channel Quality Information (CQI) for multiple UE stations 250 to each of the multiple UE stations 250, and each UE station 250 determines its channel allocation from this received CQI.

The base station 210 comprises: a transceiver 20; an antenna 25; an input 35; a multiplexer 30; a CQI reception module 212; and a CQI broadcast module 215. The UE station 250 comprises: a transceiver 60; an antenna 65; a CQI measurement module 220; a CQI monitoring module 230; a channel allocation module 240; a de-multiplexer 70; and a data output 75.

Transceiver 20 is coupled to the CQI reception module 212. CQI broadcast module 215 is also coupled to transceiver 20. Data is provided from the input 35 to the multiplexer 30. The CQI reception module 212 is coupled to the multiplexer 30 and the multiplexer 30 is also coupled to the CQI broadcast module 215 and to the transceiver 20. In the UE station 250, the transceiver 60 is coupled to the CQI measurement module 220, the CQI monitoring module 230, the channel allocation module 240 and the de-multiplexer 70. The de-multiplexer 70 provides data to the output 75.

In UE station 250, the transceiver 60 together with the CQI measurement module 220 determines the CQI for the UE station 50. This may be done using known techniques. For example, when each channel comprises a frequency channel such that the set of channels is a contiguous frequency range, a channel estimation technique may be used to obtain an impulse response for a plurality of frequency channels. Using such a technique, the CQI then comprises a series of amplitudes, referred to as coefficients, each amplitude being associated with a corresponding time delay from the time of the impulse. This information is equivalent to a frequency response for the plurality of frequency channels.

The transceiver 60 then sends the CQI information to the base station 210. This operation may be repeated at predetermined intervals. Each of the other UE stations 250 performs a similar operation, such that the receiver 20 in the base station 210 receives CQI for all of the UE stations 250 for which it will provide information that allows allocation of channels. This information is then passed to the CQI reception module 212.

The CQI reception module 212 uses an algorithm, discussed in more detail below, to compute the channel allocation for each UE station 250 employing the CQI information and provides this channel allocation to multiplexer 30. The multiplexer 30 then passes this CQI to CQI broadcast module 215, which determines how to transmit the CQI information to all UE stations 250 and provides suitable information to transceiver 20 for broadcast. For example, the CQI can be sent in a compressed form, particularly where the CQI does not change, or changes only slightly, between CQI transmissions. For example, if the channel is slowly varying, the CQI may be compressed significantly.

The transceiver 60 of UE station 250 receives the CQI information for all UE stations 250 broadcast by the base station 210 and passes this information to CQI monitoring module 230 and channel allocation module 240. The CQI monitoring module 230 is the part of the UE station 250 that corresponds with CQI broadcast module 215. The CQI monitoring module 230 determines the CQI for each UE station 250 from the received CQI data. Appropriate decompression of the CQI can be applied by CQI monitoring module 230, depending on the channel.

The channel allocation module 240 uses the same algorithm as the CQI reception module 212 in the base station 210 to determine the channel that it is allocated for use. The channel allocation module 240 uses the CQI received by the transceiver 60 to determine the channel for use by the UE station 250. The channel allocation is then passed to the de-multiplexer 70 for appropriate resource allocation, such that transmissions from the base station 210 for the UE station 250 on the allocated channel are identified and de-multiplexed.

The CQI information may include error-control data, for example cyclic redundancy check (CRC). The UE station 250 uses the error control data to determine whether or the CQI is received correctly and then sends an acknowledgement signal to the base station 210, for example based on an Automatic Repeat Request (ARQ) protocol, such that if acknowledgement is not received from all UE stations, the CQI data is re-transmitted by the base station 210.

Figure 4:
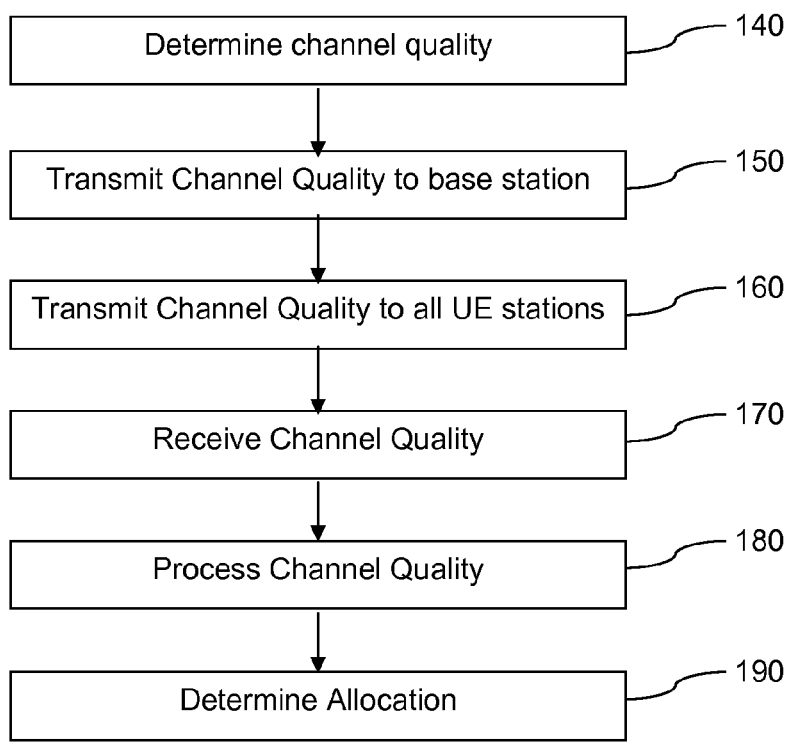
FIG. 4 shows a flow diagram, illustrating another example of a channel allocation process suitable to be used by example of FIG. 3.

Referring now to FIG. 4, there is a shown a flow diagram, illustrating an example of a channel allocation process suitable for the example of FIG. 3. As indicated with block 140, a UE station 250 determines its own CQI, and as indicated with block 150, transmits the CQI to base station 210. The UE stations 250 each perform the operations represented by blocks 140 and 150. The base station 210 then transmits the CQI information of all the UE stations 250 to all of the plurality of UE stations 250 as indicated with block 160. As indicated with block 170, a UE station 250 receives the CQI for all of the plurality of UE stations 250 and processes this information as indicated with block 180. The UE station 250 thereby determines its allocation of channels as indicated with block 190 and can proceed to use the channel or channels allocated to it.

As indicated with block 140, the CQI may be quantized, in order to allow the CQI to be transmitted from the UE station 250 to the base station 210. This allows the CQI to be processed, in order to compress the information transmitted. For example, a frequency response sufficient for use in channel allocation may be obtained using only a fraction of the coefficients obtained through channel estimation. The stages of this process may be performed repeatedly at a predetermined interval, so that the CQI for each UE station available at the base station 210 and at each UE station 250 is up to date, to allow an improved channel allocation provision.

The channels may be assumed to be subject to Additive White Gaussian Noise (AWGN) at the input of the receiver. Then, the Signal to Noise Ratio (SNR) of received carriers is directly linked to the impulse response.

An exemplary description of an impulse response may comprise six main taps (in a tapped delay-line form of representation). These need not be at integer multiples of the sampling frequency, so a tap may be represented as multiple equivalent taps such that the impulse response is estimated with more than six taps. Practically, the delays may be reported as a fraction of an OFDM symbol. If the OFDM signal is sampled using 2048 values, the number of combinations of 6 delays inside 512 values may be chosen, which requires 45 bits. Then for each delay, a relative value quantized on 4 bits may suffice. This gives 69 bits for a CQI description.

The 4 bits used for each delay represent 2 bits for the real component and 2 bits for the complex component (2×2 bits). This gives a useful indication of SNR encountered on the carriers, although more bits, such as 3 bits for the real component and 3 bits for the complex component (3×2 bits), would give a better indication. However, this allows reconstruction of the complex impulse response. In fact, only the magnitude of the impulse response is desired and so a further compression of the number of required bits is achievable. Hence, less than 69 bits might be required.

If the assumption of AWGN is incorrect, such that a signal is blocked over a frequency range, the SNR in this range at the transceiver 60 of the UE station 250 is close to zero. Thus, the locations of the maxima of the SNR remain in the same places and a useful CQI can be provided, which can be used for channel allocation.

As indicated with block 160, the CQI is transmitted from the base station 210 to each of the UE stations 250. Along with the CQI, the base station may also transmit additional information. For example, further information can be transmitted to identify the combination of UE stations 250 and channels, this combination information thereby identifies how many channels each UE station 250 should allocate.

For example, in a situation with three channels (1, 2 and 3) which can each be allocated to a single UE only and two UE stations (A and B), to each of which is to be allocated at least one channel, the number of channels allocated for UE stations (A, B) can be: (a) (2, 1); (b) (1, 1); or (c) (1, 2). Thus, there are three possible combinations. Depending on which of these three combinations is used, the CQI is used to determine how the allocation is made. For example with channels (1, 2, 3) the possible combinations are: (a) (A, A, B) (i.e. channel 1 allocated to UE station A, channel 2 allocated to UE station A, channel 3 allocated to UE station B), (A, B, A), (B, A, A); (b) (A, B, –), (A, –, B), (–, A, B), (B, A, –), (B, –, A), (–, B, A); and (c) (A, B, B); (B, A, B); (B, B, A), where – indicates that the channel is not allocated to any UE station.

As a second example, when three UE stations and three channels are available and to each UE station 210 at least one channel is to be allocated, there is only one possibility for allocation of channels: each of UE stations A, B and C is allocated one channel. (It is noted that this requires zero bits to establish.) The CQI may then be used to determine how the channels are allocated: (using the notation above) (A, B, C); (A, C, B); (B, A, C); (B, C, A); (C, A, B); (C, B, A).

As indicated with block 180, the CQI received at the UE station is processed to determine which channel or channels are allocated to the UE station 250. The channels may e.g. be allocted in an iterative manner. For instance, in each iteration, the set of UE stations to channels are to be allocated are sorted in a priority order: e.g. first, according to what their current sent ratio (in other words, how many resource blocks they have now sent against how many resource blocks they need to send) and then according to the number of channels allocated to the UE station. The UE with the highest priority is then allocated the optimal channel configuration. UE allocated the fewest UE channels in previous iterations are given higher priority.

Assuming Q=69 bits are required per CQI and that the base station 10 only transmits CQI every F=5 frames, to achieve a compression of ⅕ of the broadcast channel information, the number of bits required is reduced to $$N_b = \lceil \log_2(^{N_{RB}}C_{N_u}) \rceil + N_u \lceil Q/F \rceil,$$

C representing the combinatorial function. Since there are $N_{RB}$ channels to be allocated between $N_u$ possibilities, the number of bits needed to represent this allocation, without indicating the order of allocation, is given the combinatorial function of these values.

For 5 network stations and 110 channels, 101 bits are required, and for 10000 channels, 141 bits are required. For 100 users, if there are 110 channels, 1443 bits are required, and for 10000 channels, 2210 bits are needed. Thus, the number of bits required is significantly reduced over other approaches as the number of user stations is increased.

In the stage of transmission, represented by block 110, the allocation information may be provided to all of the UE stations 50 in a single data entity for multiple UE stations 50. This transmission may e.g. be a transmission made with one or more of the following features: a constant power level; a constant coding rate; a fixed transmission code; without transmission discontinuity, i.e. a continuous transmission; and greater than zero output power. The transmission may be addressed (i.e. comprise addressing information) to multiple UE stations (in a multicast format) or to no UE stations (in a broadcast format). The transmission may be a single transmission. A single transmission may comprise a single data structure with a single set of associated overhead information. Alternatively, the channel allocation information may be transmitted in multiple transmissions. Nevertheless, each transmission comprises channel allocation information for more than one UE station 50 and each transmission is sent to multiple UE stations 50.

In the foregoing specification, the invention has been described with reference to specific examples of embodiments of the invention. It will, however, be evident that various modifications and changes may be made therein without departing from the broader scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Also, the network station, such as UE station 50 or UE station 250, may be a portable or mobile telephone, a Personal Digital Assistant (PDA), a wireless video or multimedia device, a portable computer, or similar wireless communication device. A typical network may comprise multiple base stations, each base station being arranged to transmit channel allocation for at least one network station. Although a downlink arrangement has been described, a corresponding uplink arrangement, where the UE station 50 transmits to the base station 10 can be based on the above description.

Furthermore, the network may be of a type other than a cellular network or, such as: Wireless LAN; ad hoc networks; process control or sensor networks; and other forms of data communications network. In these other forms of network, a central station such as a base station may act as a network managing station, with responsibility for channel allocation. Network stations may communicate exclusively with the central station or exclusively with each other, or with both the central station and each other. Alternatively, one or more of the network stations may assume responsibility for channel allocation, acting as a network managing station. Without a central station being used for the channel allocation, network stations are then allocated channels for communication with each other.

In addition whilst in the described examples, all of the UE stations are provided with channel allocation information using the common transmission from the base station, in other embodiments, some UE stations may receive individual transmissions with their channel allocation. This allows backward compatibility to be provided for those UE stations not designed to handle a common description of channel allocation. Alternatively, some UE stations may have fixed channel allocations. In other words, a common description of channel allocation information is provided for multiple UE stations, but not all UE stations. In practice, the channel allocation information may be transmitted for groups of only 4 UE stations.

Also, a channel may be allocated to more than one UE station 50. This may be indicated in or inferred from the channel allocation information (for example: the channel associations can provide multiple UE station identifiers for each channel identifier; or the CQI provided to the UE stations may result in more than one UE station being allocated to a channel). Although in the examples the channel allocation information indicates channel associations including a channel and, for that channel, indicating the UE stations 50 allocated for that channel, doing this for each of the plurality of channels in turn, similar alternatives are possible. For example, the channel allocation information may indicate a UE station 50 and, for that UE station 50, indicate the channels allocated to that UE station 50, doing this in turn for each UE station 50.

Furthermore, when a UE station is allocated a single or a small number of channels and the channel allocation information comprises CQI, the UE station may execute a partial channel allocation algorithm based on the CQI. For example, channels for such UE stations may be allocated first using an existing approach and then allocate channels to other UE stations using the CQI approach. Furthermore, an algorithm can be used to allow each UE station 250 to also determine the number of channels to be allocated to each of the UE stations 250 based on the CQI alone. This algorithm may also ensure that the number of channels determined to be allocated to each of the UE stations 250 is the same at each UE station.

Also, it will also be apparent that the base station omits the channel allocation information for any inactive channels or inactive UE stations. In such case, the UE station may operate on the assumption that the CQI for another UE station corresponds to a known pre-determined Gaussian channel, when it does not receive any CQI for that other UE station within a predetermined period of time.

The CQI may comprise data regarding one or more of the: quality; performance; suitability for communication; signal strength; and an indication of the channels with the highest received signal to noise ratio. The CQI may also comprise an indicator of the quality of reception at the UE station 250 for transmissions received by that UE station 250 from the base station 210. For example, a tapped delay line decomposition may be used which splits the CQI into delay position and coefficients amplitude. Thereby, the amount of data to be sent may be reduced since it is likely that delay position will evolve more slowly than coefficients amplitude, such that only part of the CQI can be transmitted in any given frame (e.g. the coefficients amplitude).

For example in LTE, a fast moving channel is a channel for which the channel impulse response changes in each time slot (between channel allocation instances). For example, if $T_U$ is the duration of an OFDM symbol, an angular rotation of $\pi/8$ during the symbol leads to a frequency shift ($\Delta f$) given by approximately $$2\pi(\Delta f)T_U = \frac{\pi}{8}.$$

As a numerical example, $1/T_U=17000$ Hz gives about a 1 KHz shift in frequency. For a signal transmitted at 3 GHz, this corresponds to a travelling speed of 100 m/s, when channels are allocated in every possible time slot. In practice, channels are only allocated every number of time slots and so only a fraction of this travelling speed can generate similar rotations of the channel impulse response.

Furthermore the reported CQI may be filtered at the base station for the static channel, such that the quantity of information to broadcast as CQI may vary depending on whether the channel varies. A static channel can refer to an AWGN channel represented by an impulse response with only one tap. Some channels have a slowly-evolving impulse response, for instance when the UE station 250 is static or when the Doppler frequency is below 10 Hz. In such a case, there may be redundancy between consecutive reported channel impulse responses, allowing compression of the CQI. If a channel for a UE station is static, its CQI is reported periodically to the base station. The base station may average the reported CQI and broadcast this averaged CQI.

Also UE stations may be required to receive a predetermined number of control frames, for example 10, for calibration and synchronisation purposes before starting to receive data. This then implies that the minimum repetition rate for CQI is this predetermined number of frames. In this way, control information can be compressed for slowly moving channels. When the UE station has received this predetermined number of control frames, the UE station will have received the CQI for all of the other UE stations and will then be able to decompress the CQI. For example, the CQI may be transmitted every 10 time slots for a UE station A. In order to ensure that a second UE station, UE station B knows the CQI for UE station A, UE station B must have received the last 10 time slots. The CQI monitoring module 230 allows the UE station to synchronize with the CQI for each active user.

In addition, the different UE stations may use different algorithms, provided that when the algorithm is given any set of CQI as input, it provides the same channel allocation results as the algorithms used by other UE stations. Each UE station may transmit CQI information at predetermined time intervals, at a request from a base station, or triggered by other events.

Although an example of a method for allocating channels based on CQI has been discussed above, alternative methods are possible. For example, channel allocation based on CQI may use a normalized impulse response, constructed linearly. Each channel may then be allocated in sequence, and that channel is allocated to the UE station that will benefit the most from it, for example by allocating the channel to a UE station that still has channels left to be allocated and, from such UE stations, whose impulse response is maximal at that channel. A further alternative algorithm is to choose the resource allocation which maximises the average Signal to Noise plus Interference Ratio (SNIR) of the UE stations.

By receiving channel information about other users, Multi-User Detection (MUD) techniques can be implemented as well, to allow improved receiver performance at the UE stations and that the UE may use a multiple antenna configuration, such as Multiple-In Multiple-Out (MIMO). Either separate antenna CQI descriptions can be determined or an average description can be determined. The examples described above relate to wireless communication channels, which might include one or more of: radio channels; microwave channels; optical channels; ultrasonic channels. However, wired communication channels may be used as well.

Although in the examples described above, each channel of the plurality of channels is defined by an individual frequency range, that each channel may alternatively be defined in another manner, such as, by one or more of: a time slot; a frequency range; and a transmission code. Where the channel allocation information comprises CQI, for each combination of one of more of: a time slot; a frequency range; and a transmission code, the CQI may comprise different information, suitable for a description of the quality of the respective channel.

Some of the above embodiments, as applicable, may be implemented using a variety of different information processing systems. For example, although the drawings and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

The invention may also be implemented in a computer program for running on a computer system, at least including code portions for performing parts of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier or data carrying medium, such as a CD-ROM or diskette, in non-volatile memory storage media including semiconductor-based memory units such as FLASH memory, EEPROM, EPROM, ROM; ferromagnetic digital memories; MRAM; volatile storage media including registers, buffers or caches, main memory, RAM, etc., or stored with data loadable in a memory of a computer system, the data representing the computer program. The data carrier may further be a transmission medium or data connection, such as a computer network, a telephone cable or a wireless connection.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations and alternatives are also possible. The specifications and drawings are, accordingly, to be regarded in an illustrative rather than in a restrictive sense.

The invention claimed is:

1. A method of allocating a plurality of communication channels of a network, for a plurality of network stations of the network, the method comprising:
    generating a common transmission message for the plurality of network stations, said message comprising channel quality information for each of the plurality of network stations allowing an allocation of channels by said network stations; and
    transmitting said generated transmission message to said plurality of network stations.

2. The method of claim 1, further comprising encoding the transmission message at a constant coding rate.

3. The method of claim 1, wherein generating a transmission and transmitting the generated transmission are performed repeatedly at a predetermined interval.

4. The method of claim 1, wherein at least one of the network stations receives the transmission comprising the channel allocation information and determines a channel for use by the respective network station, based on the received channel allocation information.

5. The method of claim 4, wherein determining the channel to be used by a respective network station comprises processing the received channel quality information for each of the plurality of network stations to thereby determine the channel for use by the one network station, the method further comprising:
    that one network station using the determined channel.

6. The method of claim 1, wherein the channel quality information for a network station comprises an indicator of the quality of reception at the network station for transmissions received by that network station from a central station.

7. The method of claim 1, further comprising:
    determining a channel quality at a network station
    transmitting an indicator of the channel quality from that network station to a central station; and
    receiving the indicator of the channel quality at the central station; and
    wherein the channel quality information relating to each of the plurality of network stations is based on the indicator of the channel quality received at the central station.

8. The method of claim 1, wherein the plurality of network stations form part of a cellular network.

9. The method of claim 1, wherein each communication channel from the plurality of communication channels is defined by one or more of: a radio frequency range that is different from that of the other communication channels; a time slot that is different from that of the other communication channels; transmission code that is different from that of the other communication channels.

10. The method of claim 9, wherein the channel quality information for a network station comprises an indication of the impulse response for a plurality of communication channels.

11. A method of determining, by a network station, a communication channel to be used by the network station, there being a plurality of available communication channels, the method comprising:
    receiving a transmission comprising channel quality information relating to each of a plurality of network stations, the whole of the transmission being intended for each of the plurality of network stations; and
    determining a channel for use by the one network station, based on the received channel quality information.

12. The method of claim 11, wherein the channel quality information for a network station comprises an indicator of the quality of reception at the network station for transmissions received by that network station from a central station.

13. The method of claim 11, further comprising:
    determining a channel quality at a network station
    transmitting an indicator of the channel quality from that network station to a central station; and
    receiving the indicator of the channel quality at the central station; and
    wherein the channel quality information relating to each of the plurality of network stations is based on the indicator of the channel quality received at the central station.

14. The method of claim 11, wherein each communication channel from the plurality of communication channels is defined by one or more of: a radio frequency range that is different from that of the other communication channels; a time slot that is different from that of the other communication channels; transmission code that is different from that of the other communication channels.

15. The method of claim 11, wherein determining the channel to be used by a respective network station comprises processing the received channel quality information for each of the plurality of network stations to thereby determine the channel for use by the one network station, the method further comprising:
    that one network station using the determined channel.

16. A network managing station for communicating with a plurality of network stations, there being a plurality of communication channels available for use by the plurality of network stations, the network managing station comprising:
    a processor, arranged to generate a common transmission message for the plurality of network stations, said message comprising channel quality information for each of the plurality of network stations allowing an allocation of channels by said network stations, said information relating to each of the plurality of network stations; and
    a transmitter arranged to transmit the generated transmission to said plurality of networks.

17. The network managing station of claim 16, wherein:

the network managing station is arranged to receive from each of the plurality of network stations a report on channel quality information for the network station; and the common transmission message is generated based upon the reports.

18. The method of claim 16, further comprising each network station of the plurality of network stations determining a channel allocation of the network station.

19. A network station, capable of communicating over one or more of a plurality of communication channels, the network station comprising:

a receiver, arranged to receive a common transmission message for a plurality of network stations, said message comprising channel quality information for each of the plurality of network stations allowing an allocation of channels by said network stations, said information relating to each of the plurality of network stations; and a processor, arranged to determine a channel for use by the network station based on the received channel allocation information.

20. A network, comprising:

at least one network managing station according to claim 16; and a plurality of network stations each network station comprising a receiver, arranged to receive a common transmission message for a plurality of network stations, said message comprising channel quality information for each of the plurality of network stations allowing an allocation of channels by said network stations, said information relating to each of the plurality of network stations; and a processor, arranged to determine a channel for use by the network station based on the received channel allocation information.

\* \* \* \* \*